Figure 4:
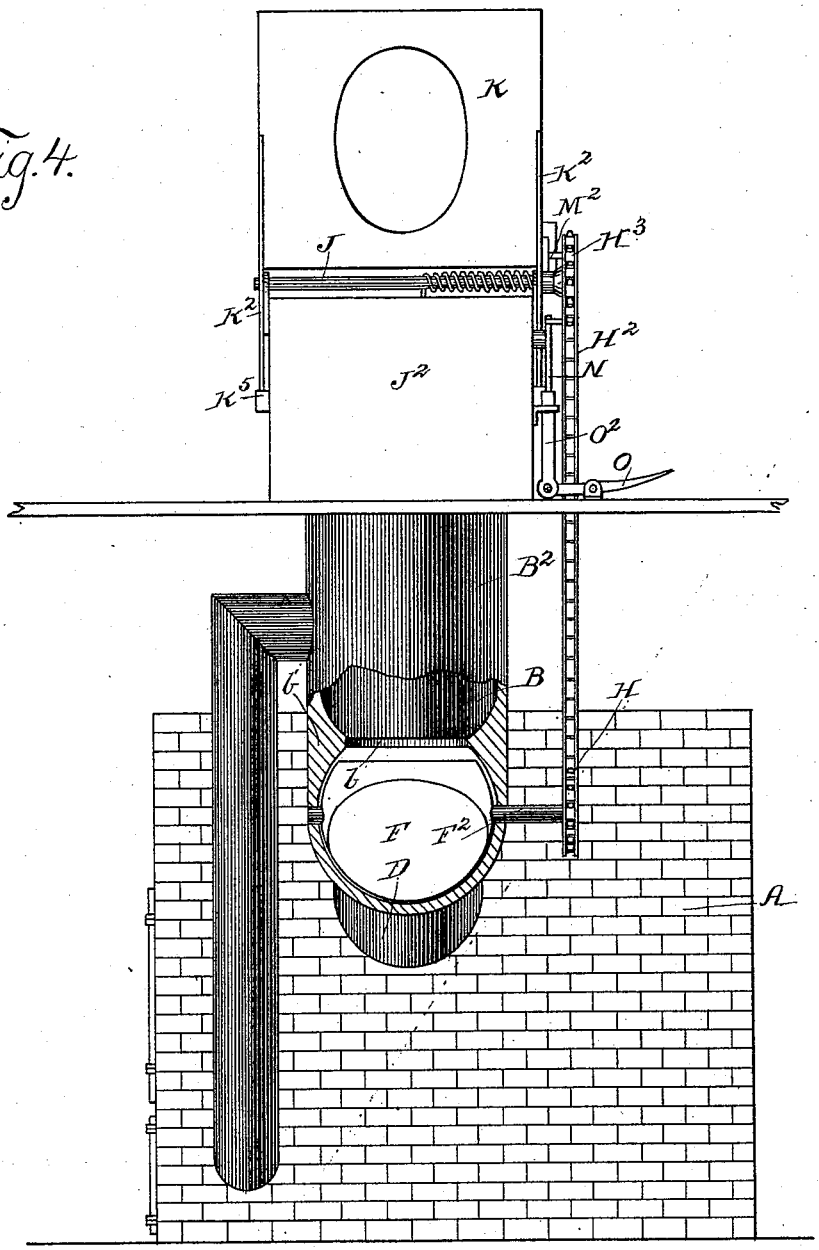

(No Model.) 2 Sheets—Sheet 1.
P. J. KRAETSCH.
CREMATOR CLOSET.
No. 456,236. Patented July 21, 1891.
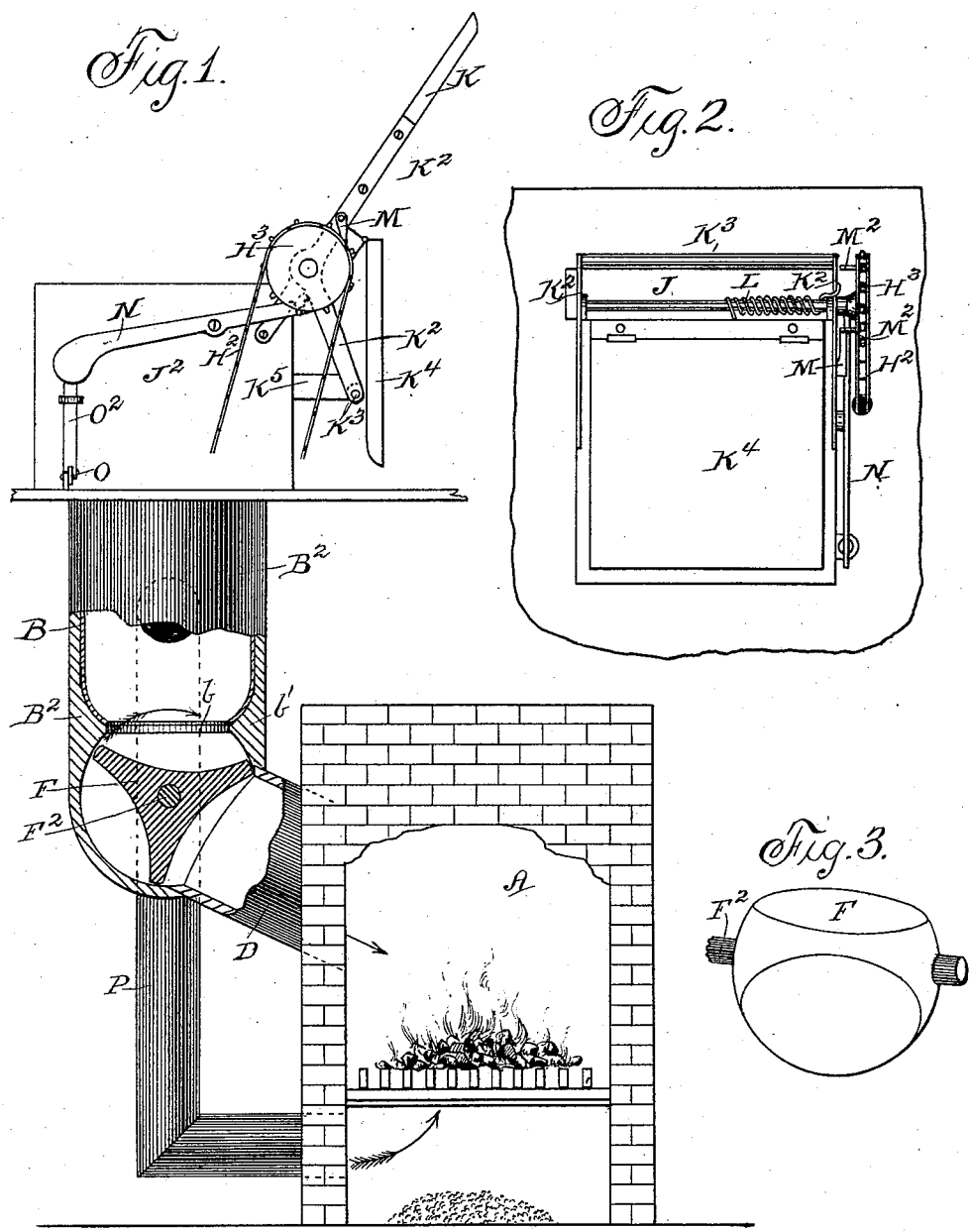
Witnesses
Inventor:
Paul J. Kraetsch,
By Thomas G. Orwig, Atty.

(No Model.) 2 Sheets—Sheet 2.

P. J. KRAETSCH.
CREMATOR CLOSET.

No. 456,236. Patented July 21, 1891.

Witnesses:
C. W. Stiles.
C. C. Buckley.

Inventor: Paul J. Kraetsch,
By Thomas G. Orwig, Atty.

UNITED STATES PATENT OFFICE.

PAUL J. KRAETSCH, OF DES MOINES, IOWA.

CREMATOR-CLOSET.

SPECIFICATION forming part of Letters Patent No. 456,236, dated July 21, 1891.

Application filed September 30, 1890. Serial No. 367,468. (No model.)

*To all whom it may concern:*

Be it known that I, PAUL J. KRAETSCH, a citizen of the United States of America, and a resident of Des Moines, in the county of Polk and State of Iowa, have invented an Improved Cremator Water-Closet, of which the following is a specification.

My invention relates to that class of dry closets or traps in which the matter deposited therein is consumed or cremated, and has for its object the provision of improved means for dumping the excrement through the gate of the cremator, and also to provide improved means for ventilating the trap, as well as means by which the basin is kept clean and the liquids evaporated.

My invention consists in a trap connected by means of a discharge-pipe with the combustion-chamber of the cremator, said trap having a series of concaved receiving-pans mounted therein in such a manner that the operator may rotate said pans by mechanism situated near the seat of said closet.

My invention consists, further, in the combination, with the trap of a cremator-closet having a series of rotatable pans mounted therein, of mechanism connecting said pans with a seat, which latter is located above the trap and capable of vertical movement, by the use of which mechanism the pans may be rotated synchronously with the elevation of the seats.

My invention consists, further, in the combination, with the seat of a cremator-closet, which seat is normally elevated, of locking mechanism to hold the seat in a horizontal position, which mechanism may be manually released to permit of the elevation of the seat.

My invention consists, further, in certain details of construction hereinafter clearly set forth, pointed out in my claims, and illustrated in the accompanying drawings, in which—

Figure 1 is a side view of my complete device, partly broken away to show the pans. Fig. 2 is a top plan view of same. Fig. 3 is a perspective view of the rotating receiving-pans. Fig. 4 is a front view of my device, the lower portion of the trap being broken away to show the rotating pans.

A represents the furnace of a cremator of ordinary form.

B represents a tubular metal basin mounted within the trap $B^2$, said basin B being slightly contracted at its lower portion and having a flange $b$. The metal trap $B^2$ is of a tubular form inclosing the basin B, and has an integral annular projection $b'$ on its inner surface, near the lower end thereof, adapted to support the contracted end of the basin B. A discharge-pipe D is fixed to the lower end portion of the trap $B^2$, and is adapted to project into the combustion-chamber of the cremator A.

F represents a trio of soil-pans formed integral with each other and mounted upon a shaft $F^2$, which shaft is supported in bearings formed in or attached to the lower end portion of trap $B^2$. Said shaft F has a sprocket-wheel H rigidly mounted upon its projecting end portion, which wheel H is connected by means of a sprocket-chain $H^2$ to a sprocket-wheel $H^3$, which latter is loosely mounted upon a stationary shaft J. Said shaft J is supported in brackets fixed to the seat-box $J^2$.

K represents the seat of my closet, of common form, and $K^2$ are elbow-shaped metal straps fixed to each of the two sides of the seat K. Each of said straps has a perforation in the bend of the elbow adapted to admit the shaft J, and thereby support said seat pivotally at the rear of the box $J^2$. The upper projecting end portions of the straps $K^2$ are connected by means of a rod $K^3$, which rod serves as a support for the hinged lid $K^4$ when said lid is elevated. The projecting end portions of the straps $K^2$ are adapted to engage against the bar $K^5$, which is fixed to the rear side of the box $J^2$, and prevent the seat from falling in the rear of said box when said seat is thrown backward by means hereinafter described.

L represents a spiral spring wound about the shaft J, and having one of its ends confined beneath a clip fixed to the rear side of the box $J^2$. The remaining end of the spiral spring L has a hook formed thereon to engage and normally press downward upon the projecting end of one of the straps $K^2$, said strap also having a pawl M pivoted thereon adapted to engage one of the plurality of pins M², which latter are fixed to the inner side of the sprocket-wheel H³ and rotate said wheel, when the resiliency of the spring L causes the seat to be thrown backward.

N represents a lever fulcrumed near its center to a bearing fixed to one side of the box J². This lever has a notch formed in the upper edge of its rear end portion adapted to admit one of the pins M² and prevent the wheel H³ from being rotated. The front end portion of this lever N is enlarged to cause the rear end portion of the said lever to remain in contact with the pins M² when said lever is in its normal position.

O represents a lever fulcrumed on a support fixed to the floor, having a reciprocating rod O² hinged to its inner end, which rod projects upward through a guide-piece and engages the front enlarged end of the lever N.

P represents a metal tube having two elbow-shaped bends therein, one end of which is adapted to be inserted through the wall of the cremator beneath the grate thereof. The opposite or upper end of said tube is adapted to be inserted through one side of the trap B² and the basin B near the middle portion thereof.

In the practical use of my invention, the seat being placed in its normal position, the pawl M and the notch in the lever N will engage two of the pins M², and by pressing downward on the outer end of the lever O² the front end of the lever N is elevated and the rear end of said lever N is released from engagement with its pin M², and the resilience of the spring L causes the seat to be thrown backward, the pawl M rotating the wheel H³ one-third of a revolution, and as the wheels H and H³ are the same size and are connected by a chain H² the pans F are caused to rotate a like distance, thus emptying the contents of one pan into the discharge-pipe and placing another pan in position to be filled. The concavity of the pans is directly beneath the contracted opening of the basin. By the use of the tube P, connected as described, the draft of the cremator is utilized to draw all the foul air and gases from the basin B into the ash-pit of the cremator, and thence through the fire in said cremator, and it is thereby consumed and thorough ventilation established. The intense heat in the cremator causes the soil that adheres to the pans and the discharge-pipe to melt and be consumed, thereby insuring cleanliness of the trap. It is apparent, also, that as one pan is receiving the night-soil one of the others is presented to the heat and fire of the cremator and the other discharging said soil. By means of the ventilator-pipe the gases of the fluids which are evaporated by the heat from the cremator are conducted underneath the grate. It is also obvious that the pans act as valves between the cremator and the basin.

I claim as my invention—

1. A cremator-closet having a trap containing a series of rotatable pans, a movable seat located above the trap, spring mechanism to elevate the seat, and detent and rotating mechanisms connecting the seat with the pans to rotate said pans isochronously with the elevation of the seat, as and for the purposes set forth.

2. A cremator-closet comprising a trap having a series of pans mounted therein, which pans are capable of being rotated, a seat supported above the trap and capable of vertical movement, means for locking said seat in a horizontal position, mechanisms for releasing and elevating the seat, and mechanisms connecting the seat with the pans to rotate said pans by the movement of the seat, as and for the purposes stated.

3. The combination, with the seat of a dry closet, of a stationary shaft attached to the box, a spring coiled about said shaft adapted to forcibly elevate said seat, and a wheel loosely mounted on said shaft, said wheel being connected with the axial shaft of the soil-pans and having pins projecting from one of its faces adapted to be engaged by a pawl secured to the seat, so that when the latter is elevated said wheel is rotated, as and for the purposes stated.

4. The combination, with the seat of a dry-closet elevated by means of a spring mounted on a stationary shaft, of a wheel loosely mounted on said shaft, which wheel is connected with the axial shaft of the soil-pans, a pawl secured to said seat adapted to engage lugs extending from one of the faces of the wheel, a lever pivoted to the box, also adapted to engage the lugs on the wheel and to hold the latter when the seat is in its normal position, and means whereby said lever may be released to permit the spring to elevate the seat and rotate the wheel, as shown and described.

5. A cremator-closet consisting of a trap, a seat located above the trap, a pipe connecting said trap with a cremator, and an open-ended pipe, one end of which is fixed to and opens from said trap and the opposite end fixed to and opening into the cremator beneath the grate thereof, as and for the purposes set forth.

6. A cremator-closet having a trap containing a series of rotatable pans, a movable seat located above the trap, manually-released spring mechanism to move said seat, and detent and rotating mechanism connecting the seat with the pans to rotate said pans synchronously with the movement of said seat, in combination with an open-ended pipe, one end of which is fixed to and opens from said trap and the opposite end fixed to and opening into the cremator beneath the grate thereof, as and for the purposes set forth.

PAUL J. KRAETSCH.

Witnesses:
C. C. BULKLEY,
M. P. SMITH.